United States Patent
Han et al.

(10) Patent No.: US 11,864,491 B2
(45) Date of Patent: Jan. 9, 2024

(54) TRANSMITTER OF MOVING ROBOT SYSTEM AND METHOD FOR DETECTING REMOVAL OF TRANSMITTER

(71) Applicant: LG Electronics Inc., Seoul (KR)

(72) Inventors: Jinwoo Han, Seoul (KR); Ilsoo Cho, Seoul (KR); Dongin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 17/211,447

(22) Filed: Mar. 24, 2021

(65) Prior Publication Data
US 2021/0345544 A1   Nov. 11, 2021

(30) Foreign Application Priority Data
May 11, 2020   (KR) .................. 10-2020-0056111

(51) Int. Cl.
| | |
|---|---|
| A01D 34/00 | (2006.01) |
| B25J 9/16 | (2006.01) |
| B25J 13/00 | (2006.01) |
| B25J 9/00 | (2006.01) |
| B25J 13/08 | (2006.01) |
| A01D 101/00 | (2006.01) |

(52) U.S. Cl.
CPC .......... A01D 34/008 (2013.01); B25J 9/0009 (2013.01); B25J 9/1674 (2013.01); B25J 13/006 (2013.01); B25J 13/088 (2013.01); A01D 2101/00 (2013.01)

(58) Field of Classification Search
CPC . A01D 34/008; A01D 2101/00; B25J 9/0009; B25J 9/1674; B25J 13/006; B25J 13/088
USPC ........................................................ 700/245
See application file for complete search history.

(56) References Cited

U.S. PATENT DOCUMENTS

| | | | | |
|---|---|---|---|---|
| 9,293,018 | B2 * | 3/2016 | Zwisler | G08B 25/008 |
| 2013/0041526 | A1 * | 2/2013 | Ouyang | A01D 34/008 701/2 |
| 2013/0169429 | A1 * | 7/2013 | Zwisler | G08B 13/22 340/572.1 |
| 2017/0026818 | A1 * | 1/2017 | Beaulieu | G01S 1/024 |
| 2020/0041601 | A1 * | 2/2020 | Ko | B25J 5/007 |

FOREIGN PATENT DOCUMENTS

| | | |
|---|---|---|
| JP | 9-330484 A | 12/1997 |
| JP | 2018-523173 A | 8/2018 |
| KR | 10-2008-0038782 A | 5/2008 |
| KR | 10-1759489 B | 7/2017 |
| KR | 10-2019-0029013 A | 3/2019 |
| KR | 10-2019-0103074 A | 9/2019 |

* cited by examiner

*Primary Examiner* — Mahmoud Gimie
(74) *Attorney, Agent, or Firm* — Birch, Stewart, Kolasch & Birch, LLP

(57) ABSTRACT

The present disclosure relates to a transmitter of a moving robot system and a method for detecting removal of the transmitter, wherein the transmitter is provided with a detection module configured to detect whether the transmitter is separated from a ground on a bottom surface of a main body of the transmitter to detect whether the transmitter is removed according to a separation distance between the main body and the ground to thereby externally inform a result of the detection.

18 Claims, 9 Drawing Sheets

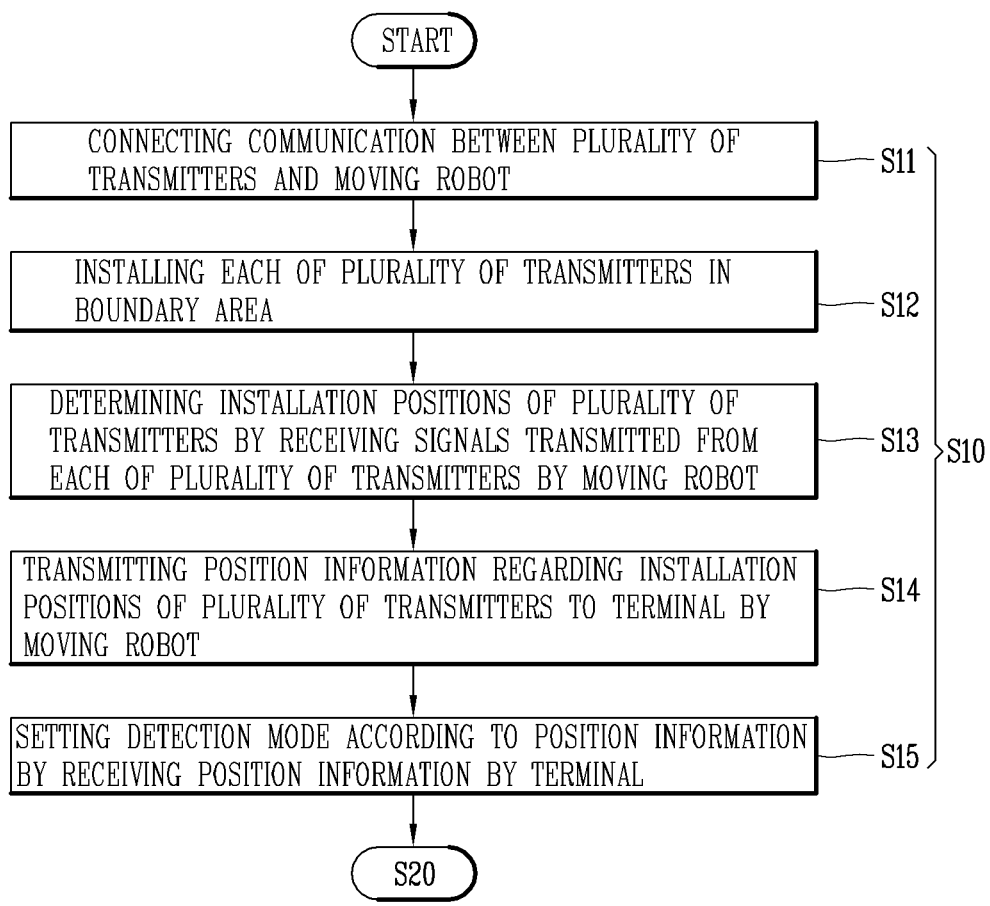

TRANSMITTER OF MOVING ROBOT SYSTEM AND METHOD FOR DETECTING REMOVAL OF TRANSMITTER

CROSS-REFERENCE TO RELATED APPLICATION

Pursuant to 35 U.S.C. § 119(a), this application claims the benefit of the earlier filing date and the right of priority to Korean Patent Application No. 10-2020-0056111, filed on May 11, 2020, the contents of which are incorporated by reference herein in their entirety.

BACKGROUND

1. Technical Field

The present disclosure relates to a transmitter of a moving robot system installed in a boundary area of a travel area and configured to transmit a signal, a moving robot system including the same, and a method for detecting removal of the transmitter.

2. Description of the Related Art

Generally, a moving robot is a device that automatically performs a predetermined operation while traveling by itself in a predetermined area without a user's operation. The moving robot senses obstacles located in the area and performs its operations by moving close to or away from such obstacles.

Such a moving robot may include a cleaning robot that carries out cleaning while traveling in the predetermined area, as well as a moving robot that mows a lawn in the predetermined area. Generally, moving devices include a riding-type device that moves according to a user's operation to cut a lawn or perform weeding when the user rides on the device, and a work-behind type or hand type device that is manually pushed or pulled by the user to move and cut a lawn. Such a moving device is moved by a direct control of the user to mow the lawn, which causes user's inconvenience in that the device is operated only directly by the user. Accordingly, research has been conducted on a moving robot-type device including elements that cuts a lawn.

Such a moving robot for lawn mowing (or a lawn mower) operates outdoors rather than indoors, and thus the moving robot for lawn mowing moves in a wider area compared to a moving robot traveling in an indoor area. In the case of indoors, a surface of the floor is monotonous (or flat), and factors such as terrain and objects affecting traveling of a moving robot are limited. A moving robot traveling in an outdoor environment is exposed to risks such as theft or burnout, thereby having poor safety and security. A moving robot, which is an expensive product, is highly likely to be subject to theft, and due to a nature of being exposed to the outdoor environment, there is a risk of being easily stolen or burned at any time by outsiders who invade the travel area. In particular, there is a greater concern of theft, as a transmitter configured to recognize the travel area is provided in plurality and installed in a distributed manner in the travel area and a size thereof is made easy to be stolen.

Meanwhile, U.S. Patent Laid-Open Publication No. 2017/0026818A1 (Published on Jan. 26, 2017) (hereinafter referred to as "related art document") discloses that a robot and a beacon are paired and signals generated from the beacon are used in traveling, or recognizing a position or a distance in a travel area. Using the technology disclosed in the related art document, theft of the beacon can be detected according to a change in communication with the beacon, that is, a change in a signal reception state.

However, in the related art document, when the beacon and the robot are far from each other, communication between the beacon and the robot is not performed due to a limitation in reception of signals transmitted from the beacon, and thereby limiting detection of theft of the beacon. In other words, the related art document did not suggest an appropriate method for detecting theft of beacons.

SUMMARY

An embodiment of the present disclosure is intended to obviate the limitations in the related art as described above.

In other words, the present disclosure is intended to provide an embodiment of a transmitter of a moving robot system and a method for detecting removal of the transmitter capable of quickly detecting whether the transmitter is removed from its installation position.

In addition, the present disclosure is intended to provide an embodiment of a transmitter of a moving robot system and a method for detecting removal of the transmitter capable of detecting whether the transmitter is removed from its installation position in a simple manner.

Further, the present disclosure is intended to provide an embodiment of a transmitter of a moving robot system and a method for detecting removal of the transmitter capable of preventing theft of the transmitter by detecting removal of the transmitter.

A transmitter of a moving robot system and a method for detecting removal of the transmitter to solve the above-described problems is provided with a module that detects whether the transmitter is separated from a ground to detect theft of the transmitter based on a result of the detection.

In other words, a transmitter of a moving robot system and a method for detecting removal of the transmitter disclosed herein is provided with a detection module configured to detect whether the transmitter is separated from a ground on a bottom surface of a main body of the transmitter to detect whether the transmitter is removed according to a separation distance between the main body and the ground to externally inform a result of the detection, and thereby solving the above-described problems.

The technical features herein may be implemented in a transmitter of a moving robot system and a method for detecting removal of the transmitter, a moving robot, a moving robot system, a lawn mowing robot, a control system of a lawn mowing robot, a method for controlling a lawn mowing robot, a method for detecting theft of a lawn mowing robot system, a method for preventing theft, and the like. The present disclosure provides an embodiment of a transmitter of a moving robot system and a method for detecting removal of the transmitter having the above-described technical features as a solution.

A transmitter of a moving robot system having the above-described technical features as a solution is a transmitter installed in a travel area of the moving robot. Here, the transmitter includes a main body, a support module provided on a bottom surface of the main body and driven into a ground to support the main body, a detection module provided on the bottom surface of the main body and configured to detect whether the main body is separated from the ground, and a communication module to perform communication with a communication target of the transmitter including the moving robot, wherein the detection module generates a notification signal for removal of the transmitter when a result of the detection corresponds to a predetermined reference condition, and wherein the communication module transmits the notification signal to the communication target.

In addition, a moving robot system having the above-described technical features as a solution includes a plurality of transmitters installed in a boundary area of a travel area to transmit signals, and a moving robot that determines a position based on a reception result of the transmitted signals to travel the travel area, wherein each of the plurality of transmitters includes a support module provided on a bottom surface of a main body and driven into a ground to support the main body, a detection module provided on the bottom surface of the main body and configured to detect whether the main body is separated from the ground, and a communication module to perform communication with at least one of the moving robot and an adjacent transmitter. Each of the plurality of transmitters generates a notification signal for removal from the ground to transmit the notification signal to at least one of the moving robot and the adjacent transmitter when a result of the detection of the detection module corresponds to a predetermined reference condition.

In addition, a method for detecting removal of a transmitter of a moving robot system having the above-described technical features as a solution is a method for detecting removal of a transmitter of a moving robot system including a plurality of transmitters installed in a boundary area of a travel area to transmit signals, a moving robot that determines a position based on a reception result of the transmitted signals to travel the travel area, and a terminal that remotely controls the moving robot by communicating with the moving robot, wherein each of the plurality of transmitters includes a support module provided on a bottom surface of a main body and driven into a ground to support the main body, a detection module provided on the bottom surface of the main body and configured to detect whether the main body is separated from the ground, and a communication module that performs communication with at least one of the moving robot and an adjacent transmitter. The method includes setting a detection mode for detecting removal of the plurality of transmitters by the terminal, detecting at least one of the plurality of transmitters removed from the ground, transmitting a notification signal generated by a removed transmitter in which the removal from the ground is detected to at least one of the moving robot and an adjacent transmitter by the removed transmitter, and externally outputting a voice notification for the removal of the removed transmitter by receiving the notification signal by the moving robot.

According to an embodiment of a transmitter of a moving robot system and a method for detecting removal of the transmitter disclosed herein, the transmitter is provided with a module configured to detect whether the transmitter is separated from a ground so as to detect whether the transmitter is removed according to a result of detecting a separation distance between a main body and the ground to thereby quickly and simply detect whether the transmitter is removed from its installation position.

Accordingly, an embodiment of a transmitter of a moving robot system and a method for detecting removal of the transmitter has an effect of efficiently preventing theft of the transmitter which has high risk of theft.

In addition, an embodiment of a transmitter of a moving robot system and a method for detecting removal of the transmitter has an effect of detecting removal of the transmitter from its installation position caused by natural or environmental influences, accident, or the like, besides theft.

In addition, an embodiment of a transmitter of a moving robot system and a method for detecting removal of the transmitter also has an effect of improving safety, security, and reliability of an environment in which the moving robot is used.

As a result, an embodiment of a transmitter of a moving robot system and a method for detecting removal of the transmitter has an effect of not only obviating limitations of the relate art, but also improving usability, efficiency, effectiveness, and applicability in a technical field of a moving robot for lawn mowing.

BRIEF DESCRIPTION OF THE DRAWINGS

FIG. 10 is a flowchart showing a specific example of a sequence of a method for detecting removal of a transmitter of a moving robot system according to an embodiment from its installation position.

DETAILED DESCRIPTION

Figure 1A:
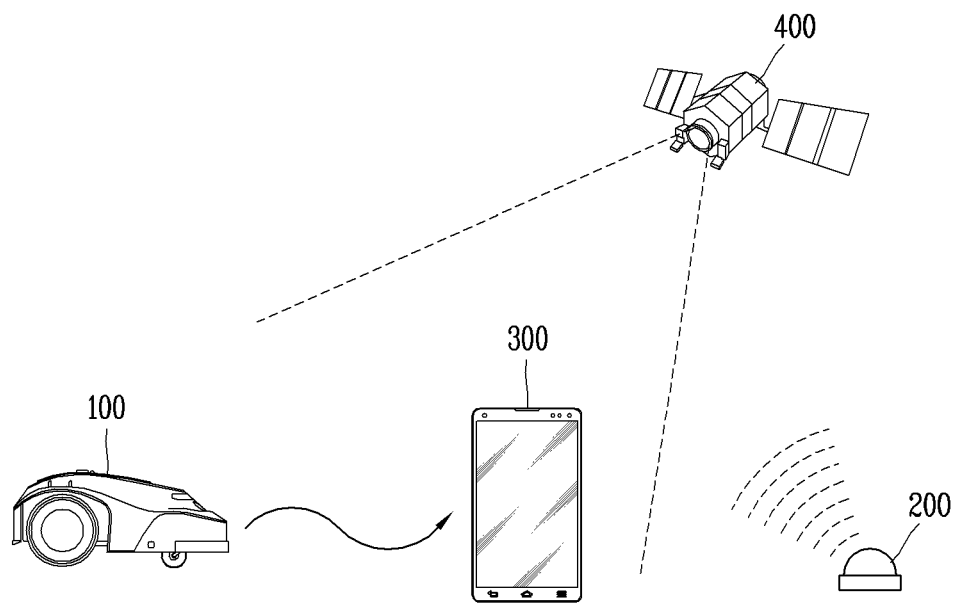
FIG. 1A is a conceptual view illustrating a traveling principle of a moving robot system.

Hereinafter, embodiments of a transmitter of a moving robot system and a method for detecting removal of the transmitter will be described in detail with reference to the accompanying drawings, and the same reference numerals are used to designate the same/like components and redundant description thereof will be omitted.

In describing technologies disclosed in the present disclosure, if a detailed explanation for a related known function or construction is considered to unnecessarily divert the idea of the technologies in the present disclosure, such explanation has been omitted but would be understood by those skilled in the art. It should be noted that the attached drawings are provided to facilitate understanding of the technical idea disclosed in this specification, and should not be construed as limiting the technical idea by the attached drawings.

First, an embodiment of a moving robot system (hereinafter referred to as a "system") will be described.

The robot may refer to a robot, a lawn-mowing moving robot, a lawn mowing robot, a lawn mowing device, or a moving robot for lawn mowing capable of traveling autonomously.

A system 1 may be a system of a moving robot (hereinafter referred to as a "robot") that cuts a lawn in a travel area. Here, the robot may be a lawn mowing robot. In other words, the system 1 may be a traveling/control/operation system of a lawn mowing robot that cuts a lawn in a travel area.

As illustrated in FIG. 1A, the system 1 includes a terminal 300 displaying a control screen for controlling operation of a robot 100, and the robot 100 operating in response to an input (or manipulation) on the control screen. In more detail, the terminal 300 displays the control screen for controlling the robot 100 on a display of the terminal 300, and the robot 100 may be operated to cut a lawn in the travel area while traveling according to the input on the control screen. The system 1 may further include a transmitter 200 and a GPS satellite 400 transmitting and receiving signals to and from at least one of the robot 100 and the terminal 300.

Figure 1B:
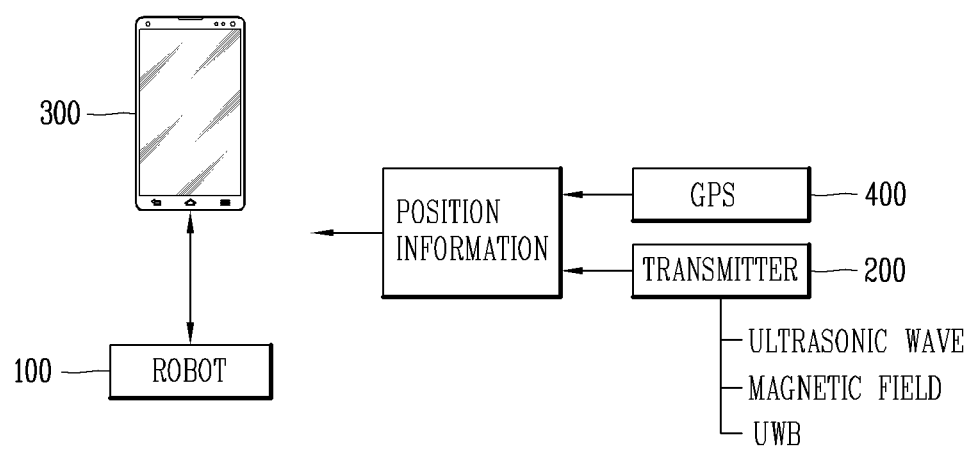
FIG. 1B is a conceptual view illustrating a signal flow between devices to determine a position of a moving robot system.

In the system 1, the robot 100 may operate according to a traveling mechanism (or principle) as illustrated in FIG. 1A, and a signal may flow between devices for determining a position as illustrated in FIG. 1B. Accordingly, the robot 100 may travel in a travel area 1000 as illustrated in FIG. 2.

Figure 2:
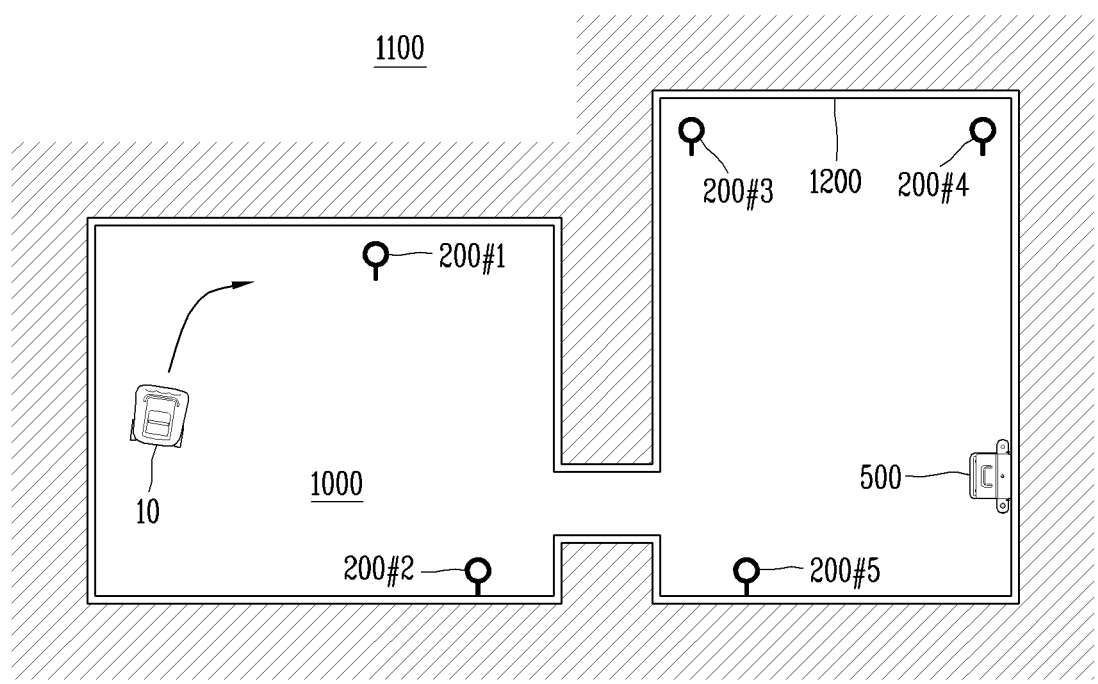
FIG. 2 is a conceptual view illustrating one embodiment of a travel area of a moving robot.

The robot 100 may travel by itself in the travel area 1000 illustrated in FIG. 2. The robot 100 may perform particular operation during traveling. Here, the particular operation may be cutting a lawn in the travel area 1000. The travel area 1000 is a target area in which the robot 100 is to travel and operate. A predetermined outside/outdoor area may be provided as the travel area 1000. For example, a garden, a yard, or the like in which the robot 100 is to cut a lawn may be provided as the travel area 1000. A charging apparatus 500 for charging the robot 100 with driving power may be installed in the travel area 1000. The robot 100 may be charged with driving power by docking with the charging apparatus 500 installed in the travel area 1000.

The travel area 1000 may be provided by a predetermined boundary area 1200, as illustrated in FIG. 2. The boundary area 1200 corresponds to a boundary line between the travel area 1000 and an outside area 1100, and the robot 100 may travel within the boundary area 1200. In this case, the boundary area 1200 may be defined in a closed curve shape or a closed loop shape. Also, in this case, the boundary area 1200 may be defined by a wire in a shape of a closed curve or a closed loop. The wire 1200 may be installed in an arbitrary area. The robot 100 may travel in the travel area 1000 defined in a closed curved shape formed by the installed wire 1200.

As illustrated in FIG. 2, the transmitter 200 may be provided in plurality in the travel area 1000. The transmitter 200 is a signal generation element configured to transmit a signal to determine position (or location) information regarding the robot 100, and a plurality of transmitters 200 may be installed in the travel area 1000 in a distributed manner. The robot 100 may receive signals transmitted from the transmitters 200 to determine a current position of the robot 100 based on a result of the reception, or to determine position information regarding the travel area 1000. In this case, a receiver of the robot 100 may receive the transmitted signals. The transmitters 200 may be provided in a periphery of the boundary area 1200 of the travel area 1000. Here, the robot 100 may determine the boundary area 1200 based on installed positions of the transmitters 200 in the periphery of the boundary area 1200.

As illustrated in FIG. 1A, the robot 100 may communicate with the terminal 300 moving in a predetermined area, and travel by following a position of the terminal 300 based on data received from the terminal 300. The robot 100 may set a virtual boundary in a predetermined area based on position information received from the terminal 300 or collected while the robot 100 is traveling by following the terminal 300, and may set an internal area formed by the virtual boundary as the travel area 1000. When the boundary area 1200 and the travel area 1000 are set, the robot 100 may travel in the travel area 1000 not to deviate from the boundary area 1200. According to cases, the terminal 300 may set the boundary area 1200 and transmit the boundary area 1200 to the robot 100. When the terminal 300 changes or expands an area, the terminal 300 may transmit changed information to the robot 100 so that the robot 100 may travel in a new area. Also, the terminal 300 may display data received from the robot 100 on a screen to monitor operation of the robot 100.

The robot 100 or the terminal 300 may determine a current position by receiving position information. The robot 100 and the terminal 300 may determine a current position based on a signal for position information transmitted from the transmitter 200 in the travel area 1000 or a global positioning system (GPS) signal obtained using the GPS satellite 400. The robot 100 and the terminal 300 may preferably determine a current position by receiving signals transmitted from at least three transmitters 200 and comparing the signals with each other.

The robot 100 sets one specific point in the travel area 1000 as a reference position, and then calculates a position while the robot 100 is moving as a coordinate. For example, an initial starting position, that is, a position of the charging apparatus 500 may be set as a reference position. Alternatively, a position of one of the plurality of transmitters 200 may be set as a reference position to calculate a coordinate in the travel area 1000. The robot 100 may set an initial position of the robot 100 as a reference position in each operation, and then determine a position of the robot 100 while the robot 100 is traveling. With respect to the reference position, the robot 100 may calculate a traveling distance based on rotation times and a rotational speed of a driving wheel, a rotation direction of a main body, etc. to thereby determine a current position in the travel area 1000. Even when the robot 100 determines a position of the robot 100 using the GPS satellite 400, the robot 100 may determine the position using a specific point as a reference position.

As shown in FIG. 1B, the robot 100 may determine a current position based on position information transmitted from the transmitter 200 or the GPS satellite 400. The position information may be transmitted in the form of a GPS signal, an ultrasound signal, an infrared signal, an electromagnetic signal, or an ultra-wideband (UWB) signal. A signal transmitted from the transmitter 200 may preferably be a UWB signal. Accordingly, the robot 100 may receive the UWB signal transmitted from the transmitter 200, and determine a current position based on the UWB signal.

Figure 3A:
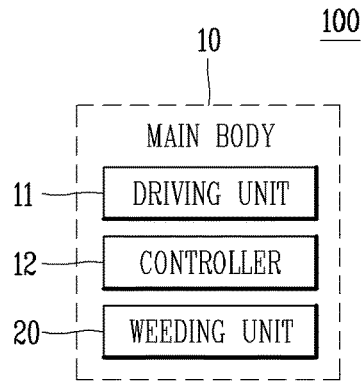
FIG. 3A is a configuration diagram (a) of a moving robot according to an embodiment.

As illustrated in FIG. 3A, the robot 100 that cuts a lawn while traveling in the travel area 1000 may include a main body 10, a driving unit 11 moving the main body 10, a weeding unit 30 cutting a lawn while traveling, and a controller 20 controlling traveling and cutting operation of the robot 100 by controlling the driving unit 11 and the weeding unit 30.

Figure 3B:
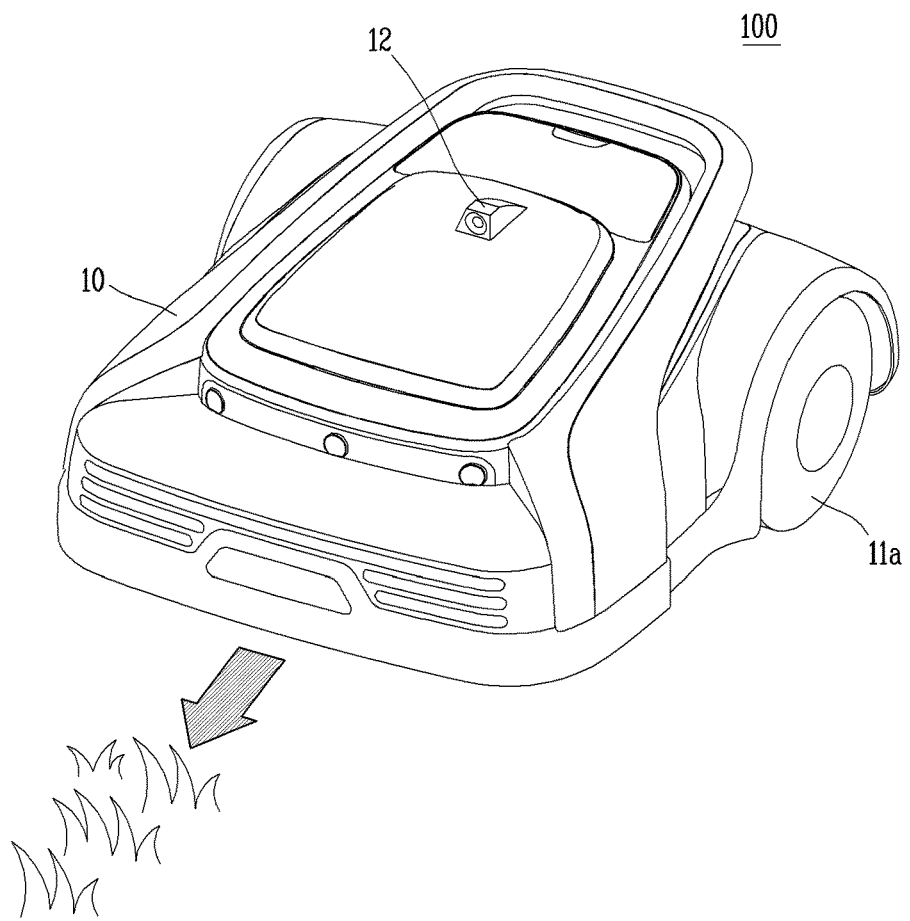
FIG. 3B is a configuration diagram (b) of a moving robot according to an embodiment.
Figure 3C:
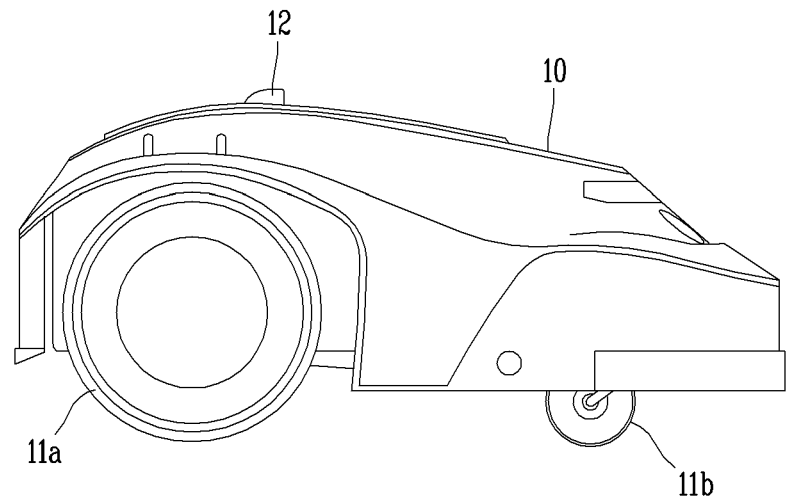
FIG. 3C is a configuration diagram (c) of a moving robot according to an embodiment.

As shown in FIGS. 3B and 3C, the robot 100 may be an autonomous traveling robot including the main body 10 configured to be movable so as to cut a lawn. The main body 10 defines an outer shape (or appearance) of the robot 100 and includes one or more elements performing operation such as traveling of the robot 100 and cutting of a lawn. The main body 10 includes the driving unit 11 that may move the main body 10 in a desired direction and rotate the main body 10. The driving unit 11 may include a plurality of rotatable driving wheels. Each of the driving wheels may individually rotate so that the main body 10 rotates in a desired direction. In detail, the driving unit 11 may include at least one main driving wheel 11a and an auxiliary wheel 11b. For example, the main body 10 may include two main driving wheels 11a, and the two main driving wheels may be installed at a rear bottom surface of the main body 10.

In the robot 100, the controller 20 may control traveling and lawn mowing of the robot 100 by determining a current position of the main body 10 so as to travel in the travel area 1000, and controlling the weeding unit 30 to cut a lawn while the main body 10 is traveling in the travel area 1000.

Figure 4:
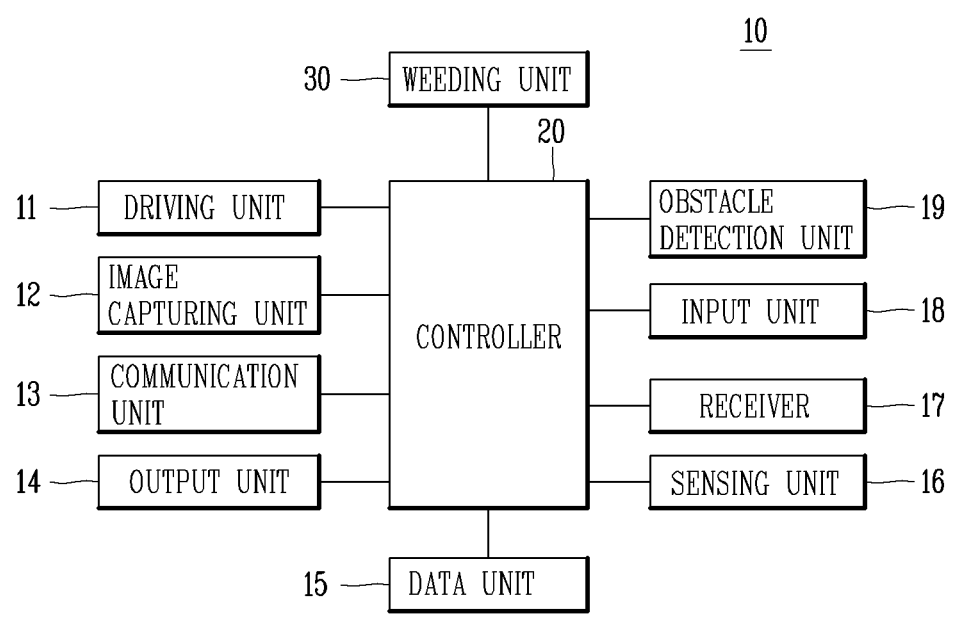
FIG. 4 is a detailed configuration diagram of a moving robot.

Referring to FIG. 4, the robot 100 operating as described above may include the main body 10, the driving unit 11, the weeding unit 30, and the controller 20, so as to cut a lawn while traveling in the travel area 1000. Also, the robot 100 may further include at least one selected from an image capturing unit 12, a communication unit 13, an output unit 14, a data unit 15, a sensing unit 16, a receiver 17, an input unit 18, and an obstacle detection unit 19.

The driving unit 11 is a driving wheel provided at a lower portion of the main body 10, and may be rotationally driven to move the main body 10. In other words, the driving unit 11 may be driven to allow the main body 10 to travel in the travel area 1000. The driving unit 11 may include at least one driving motor to move the main body 10 so that the robot 100 travels. For example, the driving unit 11 may include a left wheel driving motor to rotate a left wheel and a right wheel driving motor to rotate a right wheel.

The driving unit 11 may transmit information regarding a driving result to the controller 20, and receive a control command for operation from the controller 20. The driving unit 11 may operate according to the control command received from the controller 20. In other words, the driving unit 11 may be controlled by the controller 20.

The image capturing unit 12 may be a camera capturing an image of a periphery of the main body 10 to generate image information regarding the travel area 1000 of the main body 10. The image capturing unit 12 may capture an image of a forward direction of the main body 10 to detect an obstacle around the main body 10 and in the travel area 1000. The image capturing unit 12 may capture an image of a forward direction of the main body 10 to detect an obstacle around the main body 10 and in the travel area 1000. The image capturing unit 12 is a digital camera, which may include an image sensor (not illustrated) and an image processing unit (not illustrated). The image sensor is a device that converts an optical image into an electrical signal. The image sensor includes a chip in which a plurality of photodiodes is integrated. A pixel may be an example of a photodiode. Electric charges are accumulated in the respective pixels by an image, which is formed on the chip by light passing through a lens, and the electric charges accumulated in the pixels are converted into an electrical signal (for example, voltage). A charge-coupled device (CCD) sensor and a complementary metal oxide semiconductor (CMOS) sensor are well known as image sensors. In addition, the camera may include a digital signal processor (DSP) for processing a captured image to generate the image information.

The image capturing unit 16 may transmit information regarding a result of the image capturing to the controller 20, and receive a control command for operation from the controller 20. The image capturing unit 16 may operate according to the control command received from the controller 20. In other words, the image capturing unit 16 may be controlled by the controller 20.

The communication unit 13 may communicate with at least one communication target element that communicates with the robot 100. The communication unit 13 may communicate with the transmitter 200 and the terminal 300 using a wireless communication method. The communication unit 13 may be connected to a predetermined network so as to communicate with an external server or the terminal 300 that controls the robot 100. When the communication unit 13 communicates with the terminal 300, the communication unit 13 may transmit a generated map to the terminal 300, receive a command from the terminal 300, and transmit data regarding an operation state of the robot 100 to the terminal 300. The communication unit 13 may include a communication module such as wireless fidelity (Wi-Fi), wireless broadband (WiBro), or the like, as well as a short-range wireless communication module such as Zigbee, Bluetooth, or the like, to transmit and receive data.

The communication unit 13 may transmit information regarding a result of the communication to the controller 20, and receive a control command for operation from the controller 20. The communication unit 13 may operate according to the control command received from the controller 20. In other words, the communication unit 13 may be controlled by the controller 20.

The output unit 14 may include an output element such as a speaker to output an operation state of the robot 100 in the form of a voice (or audio). The output unit 14 may output an alarm when an event occurs while the robot 100 is moving. For example, when the power is run out, an impact or shock is applied to the robot 100, or an accident occurs in the travel area 1000, an alarm voice may be output so that the corresponding information is provided to a user.

The output unit 14 may transmit information regarding an operation state to the controller 20 and receive a control command for operation from the controller 20. The output unit 14 may operate according to a control command received from the controller 20. In other words, the output unit 14 may be controlled by the controller 20.

The data unit 15 is a storage element that stores data readable by a microprocessor, and may include a hard disk drive (HDD), a solid state disk (SSD), a silicon disk drive (SDD), a read only memory (ROM), a random access memory (RAM), CD-ROM, a magnetic tape, a floppy disk, or an optical data storage device. In the data unit 15, there may be stored a received signal, reference data to determine an obstacle, and obstacle information regarding a detected obstacle. In addition, in the data unit 15, there may further be stored control data that controls operation of the robot 100, data according to an operation mode of the robot 100, position information collected, and information regarding the travel area 1000 and the boundary area 1200.

The sensing unit 16 may include at least one sensor that senses information regarding a posture and operation of the main body 10. The sensing unit 16 may include at least one selected from an inclination sensor that detects movement of the main body 10 and a speed sensor that detects a driving speed of the driving unit 11. The inclination sensor may be a sensor that senses posture information regarding the main body 10. When the main body 10 is inclined forward, backward, leftward or rightward, the inclination sensor may sense the posture information regarding the main body 10 by calculating an inclined direction and an inclination angle. A tilt sensor, an acceleration sensor, or the like may be used as the inclination sensor. In the case of the acceleration sensor, any of a gyro type sensor, an inertial type sensor, and a silicon semiconductor type sensor may be used. In addition, various sensors or devices capable of detecting movement of the main body 10 may be used. The speed sensor may be a sensor for sensing a driving speed of a driving wheel provided in the driving unit 11. When the driving wheel rotates, the speed sensor may sense the driving speed by detecting rotation of the driving wheel.

The sensing unit 16 may transmit information regarding a sensing result to the controller 20, and receive a control command for operation from the controller 20. The sensing unit 16 may operate according to a control command received from the controller 20. In other words, the sensing unit 16 may be controlled by the controller 20.

The receiver 17 may include a plurality of signal sensor modules that transmits and receives position information. The receiver 17 may include a position sensor module that receives the signals transmitted from the transmitter 200. The position sensor module may transmit a signal to the transmitter 200. When the transmitter 200 transmits a signal using a method selected from an ultrasound method, a UWB method, and an infrared method, the receiver 17 may include a sensor module that transmits and receives an ultrasound signal, a UWB signal, or an infrared signal, in correspondence with this. The receiver 17 may include a UWB sensor. As a reference, UWB radio technology refers to a technology using a very wide frequency range of several GHz or more in baseband instead of using a radio frequency (RF) carrier. The UWB radio technology uses very narrow pulses of several nanoseconds or several picoseconds. Since pulses emitted from such a UWB sensor are several nanoseconds or several picoseconds long, the pulses have good penetrability. Thus, even when there are obstacles in a periphery of the UWB sensor, the receiver 17 may receive very short pulses emitted by other UWB sensors.

When the robot 100 travels by following the terminal 300, the terminal 300 and the robot 100 include the UWB sensor, respectively, thereby transmitting or receiving a UWB signal with each other through the UWB sensor. The terminal 300 may transmit the UWB signal to the robot 100 through the UWB sensor included in the terminal 300. The robot 100 may determine a position of the terminal 300 based on the UWB signal received through the UWB sensor, allowing the robot 100 to move by following the terminal 300. In this case, the terminal 300 operates as a transmitting side, and the robot 100 operates as a receiving side. When the transmitter 200 includes the UWB sensor and transmits a signal, the robot 100 or the terminal 300 may receive the signal transmitted from the transmitter 200 through the UWB sensor included in the robot 100 or the terminal 300. At this time, a signaling method performed by the transmitter 200 may be identical to or different from signaling methods performed by the robot 100 and the terminal 300.

The receiver 17 may include a plurality of UWB sensors. When two UWB sensors are included in the receiver 17, for example, provided on left and right sides of the main body 10, respectively, the two USB sensors may receive signals, respectively, and compare a plurality of received signals with each other to thereby calculate an accurate position. For example, according to positions of the robot 100, the transmitter 200, or the terminal 300, when a distance measured by a left sensor is different from a distance measured by a right sensor, a relative position between the robot 100 and the transmitter 200 or the terminal 300, and a direction of the robot 100 may be determined based on the measured distances.

The receiver 17 may further include a GPS module for transmitting and receiving a GPS signal to and from the GPS satellite 400.

The receiver 17 may transmit the reception result of the signal to the controller 20, and receive a control command for operation from the controller 20. The receiver 17 may operate according to the control command received from the controller 20. In other words, the receiver 17 may be controlled by the controller 20.

The input unit 18 may include at least one input element such as a button, a switch, a touch pad, or the like, and an output element such as a display, or the like to receive a user command and output an operation state of the robot 100. For example, a command for performing a monitoring mode may be input and a state for performing the monitoring mode may be output via the display.

The input unit 18 may display a state (or status) of the robot 100 through the display, and display a control screen on which manipulation or an input is applied for controlling the robot 100. The control screen may refer to a user interface screen on which a driving state of the robot 100 is displayed, and a command for driving manipulation of the robot 100 is input from a user. The control screen may be displayed on the display under the control of the controller 20, and a display and an input command on the control screen may be controlled by the controller 20.

The input unit 18 may transmit information regarding an operation state to the controller 20 and receive a control command for operation from the controller 20. The input unit 18 may operate according to a control command received from the controller 20. In other words, the input unit 18 may be controlled by the controller 20.

The obstacle detection unit 19 includes a plurality of sensors to detect obstacles located in a traveling direction. The obstacle detection unit 19 may detect an obstacle located in a forward direction of the main body 10, that is, in a traveling direction of the main body 10 using at least one selected from a laser sensor, an ultrasonic sensor, an infrared sensor, and a three-dimensional (3D) sensor. The obstacle detection unit 19 may further include a cliff detection sensor installed on a rear surface of the main body 10 to detect a cliff.

The obstacle detection unit 19 may transmit information regarding a result of the detection to the controller 20, and receive a control command for operation from the controller 20. The obstacle detection unit 19 may operate according to the control command received from the controller 20. In other words, the obstacle detection unit 19 may be controlled by the controller 20.

The weeding unit 30 cuts a lawn while traveling. The weeding unit 30 is provided with a brush or blade for cutting a lawn, so as to cut the lawn in a rotating manner.

The weeding unit 30 may transmit information regarding a result of operation to the controller 20 and receive a control command for operation from the controller 20. The weeding unit 30 may operate according to the control command received from the controller 20. In other words, the weeding unit 30 may be controlled by the controller 20.

The controller 20 may include a central processing unit to control an overall operation of the robot 100. The controller 20 may determine a particular point in the travel area 1000 at which traveling of the main body 10 is limited, i.e., a condition of the travel area 1000, via the main body 10, the driving unit 11, and the image capturing unit 12, and control functions and operations of the robot 100 to be performed via the communication unit 13, the output unit 14, the data unit 15, the sensing unit 16, the receiver 17, the input unit 18, the obstacle detection unit 19, and the weeding unit 30.

The controller 20 may control input and output of data, and control the driving unit 11 so that the main body 10 travels according to settings. The controller 20 may independently control operations of the left wheel driving motor and the right wheel driving motor by controlling the driving unit 11 to thereby control the main body 10 to travel in a curved line or a straight line.

The controller 20 may set the boundary 1200 of the travel area 1000 based on position information received from the terminal 300 or position information determined based on the signal received from the transmitter 200. The controller 20 may also set the boundary 1200 of the travel area 1000 based on position information collected by the controller 20 during traveling. The controller 20 may set a specific area in a region defined by the set boundary 1200 as the travel area 1000. The controller 20 may set the boundary area 1200 in a closed loop form by connecting discontinuous position information in a line or a curve, and set an inner area within the boundary area 1200 as the travel area 1000. When the travel area 1000 and the boundary area 1200 corresponding thereto are set, the controller 20 may control traveling of the main body 10 so that the main body 10 travels in the travel area 1000 without deviating from the set boundary area 1200. The controller 20 may determine a current position based on received position information and control the driving unit 11 so that the determined current position is located in the travel area 1000 to thereby control traveling of the main body 10.

In addition, according to obstacle information input by at least one of the image capturing unit 12 and the obstacle detection unit 19, the controller 20 may control the main body 10 to travel while avoiding obstacles. In this case, the controller 20 may modify the travel area 1000 by reflecting the obstacle information on pre-stored area information regarding the travel area 1000.

As such, the robot 100 including the main body 10, the driving unit 11, the weeding unit 30, and the controller 20, and configured to travel in the travel area 1000 may be operated according to a plurality of operation modes. Here, the operation mode refers to a mode in which the robot 100 performs operation according to a predetermined reference, and one of the plurality of operation modes may be set via the robot 100 or the terminal 300. Accordingly, the terminal 300 displays a control screen according to a set operation mode to control operation of the robot 100, and the robot 100 may perform operation according to the operation mode. The system 1 may control operation of the robot 100 so that the robot 100 operates according to at least one of the plurality of operation modes.

In the system 1, the transmitter 200 may be installed in the travel area 1000 to transmit a signal.

Figure 5:
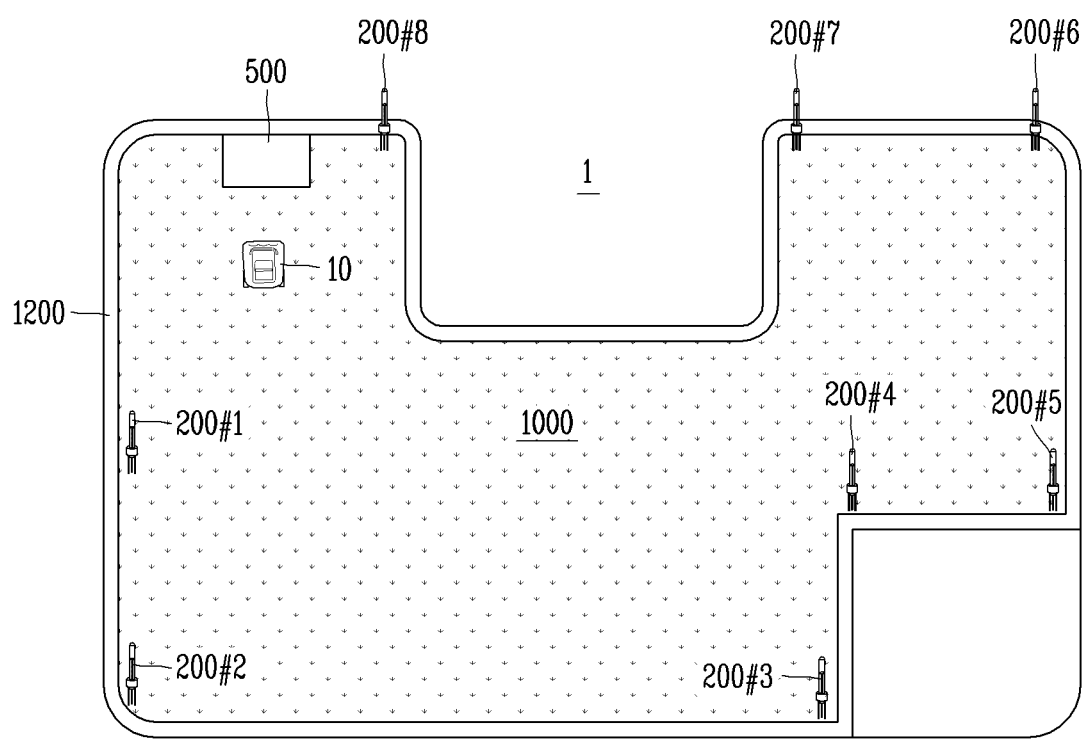
FIG. 5 is an exemplary view illustrating an example of the moving robot system according to an embodiment.

The transmitter 200 may be provided in plurality and installed in the travel area 1000 in a distributed manner. For example, as illustrated in FIG. 5, a first transmitter 200 #1 to an eighth transmitter 200 #8 may be installed in the travel area 1000 in a distributed manner.

Here, the transmitter 200 is installed in the boundary area of the travel area 1000 to transmit a signal from the boundary area. And accordingly, the robot 100 may determine a position of the transmitter 200, namely, the position of the transmitter 200 installed the boundary area, based on the signal transmitted from the boundary area by the transmitter 200, to thereby recognize the boundary area.

Here, an installation number of the transmitters 200 may vary according to a size and shape of the travel area 1000.

Figure 6:
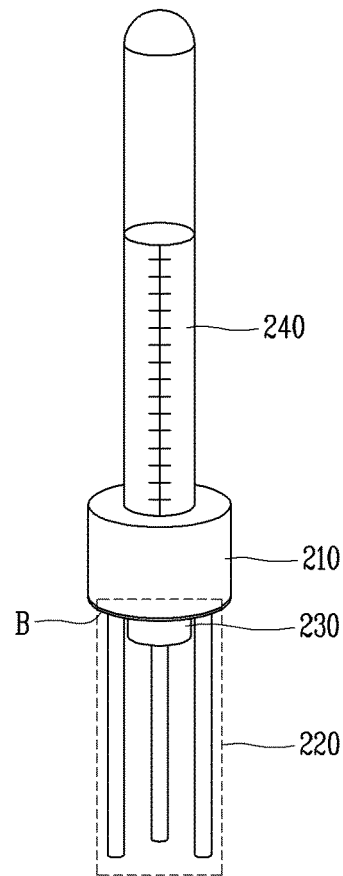
FIG. 6 is an exemplary view of a transmitter of a moving robot system according to an embodiment.
Figure 7:
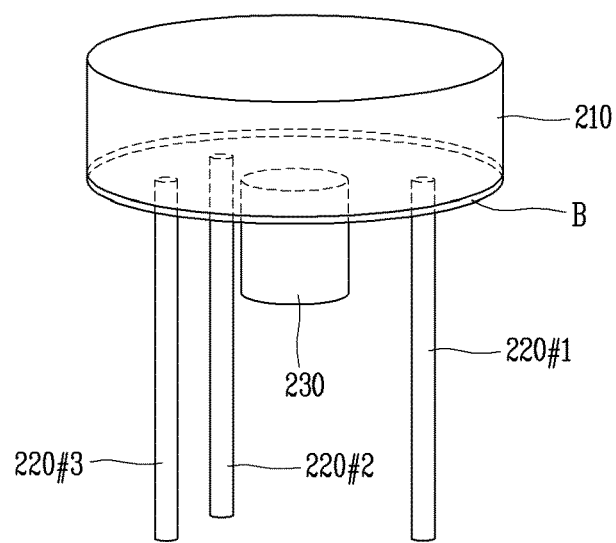
FIG. 7 is an enlarged exemplary view of a main body of the transmitter illustrated in FIG. 6.

The transmitter 200, as illustrated FIG. 6, may be defined in a shape of a rod or a support.

Since the transmitter 200 is defined in a shape of a rod or a support as illustrated FIG. 6, the transmitter 200 may be installed in the travel area 1000 in a manner of being driven into a ground on the travel area 1000.

The transmitter 200 may include a main body 210, a support module 220 provided on a bottom surface B of the main body 210 and driven into the ground to support the main body 210, a detection module 230 provided on the bottom surface B of the main body 210 and configured to detect whether the main body 210 is separated from the ground, and a communication module 240 to communicate with a communication target of the transmitter 200 including the robot 100.

As such, in the transmitter 200 including the main body 210, the support module 220, the detection module 230, and the communication module 240, the detection module 230 generates a notification signal for removal of the transmitter 200 when a result of the detection corresponds to a predetermined reference condition, and the communication module 240 transmits the notification signal to the communication target to detect whether the transmitter 200 is removed from its installation position.

A specific embodiment of the transmitter 200 including the main body 210, the support module 220, the detection module 230, and the communication module 240 may be as illustrated in FIG. 6.

The main body 210 may be formed in a cylindrical shape to define an appearance of the transmitter 200.

The support module 220 and the detection module 230 may be provided on the bottom surface B of the main body 210, and the communication module 240 may be provided on a top surface of the main body 210 or inside the main body 210.

The support module 220 may be formed in a pin shape on the bottom surface B to be vertically driven into the ground on the boundary area 1200.

The support module 220 may include a plurality of pins 220 #1 to 220 #3 vertically driven into the ground.

Here, the support module 220 may preferably include at least three pins 220 #1, 220 #2, and 220 #3.

The plurality of pins 220 #1 to 220 #3 may be formed identically, or at least one of them may be formed differently.

The plurality of pins 220 #1 to 220 #3 may be driven into the ground such that a distance between the bottom surface B and the ground is within a predetermined distance.

Here, the predetermined distance may be a distance at which the detection module 230 is able to detect separation from the ground.

In other words, the plurality of pins 220 #1 to 220 #3 may be driven into the ground to such an extent that the detection module 230 can detect separation from the ground.

For example, when the detection module 230 is to detect separation from the ground according to whether or not the detection module 230 is in contact with the ground, the plurality of pins 220 #1 to 220 #3 is driven into the ground to an extent that the detection module 230 touches the ground.

Alternatively, when a detectable distance of the detection module 230 is 10 cm at the most, the plurality of pins 220 #1 to 220 #3 is driven into the ground so that the distance between the bottom surface B and the ground is within 10 cm.

The detection module 230 may be operated by receiving power from a battery built in the main body 210.

The detection module 230 may detect a distance between the main body 210 and the ground in a state in which the support module 220 is driven into the ground such that the separation distance between the bottom surface B and the ground is within the predetermined distance.

In other words, the detection module 230 may detect whether the transmitter 200 is removed from its installation position by detecting the separation distance between the bottom surface B and the ground.

When a result of the detection detecting the separation distance between the main body 210 and the ground corresponds to a predetermined reference condition, the detection module 230 may generate a notification signal for removal of the transmitter 200.

Here, the reference condition may be a reference corresponding to a condition when the transmitter 200 is removed.

For example, when the separation distance between the main body 210 and the ground exceeds a predetermined distance according to the reference condition, the notification signal may be generated.

The detection module 230 may detect whether the main body 210 is separated from the ground in a state in which a detection mode for detecting whether the transmitter 200 is removed from the ground is set in the robot 100.

In other words, the detection module 230 may consume power by operating only in a state in which the detection mode is set.

Accordingly, since the detection module 230 does not operate when the detection mode is not set, and thereby not consuming power for detecting whether the main body 210 is separated from the ground, unnecessary power consumption may be prevented.

The detection mode is one of the operation modes of the robot 100 and may be set by the robot 100 or the terminal 300.

The detection mode may be a mode for detecting removal of the transmitter 200 based on whether the transmitter 200 is separated from the ground in a state in which the transmitter 200 is installed in the boundary area 1200.

The detection module 230 may include a switch that is turned on or off according to whether the detection module 230 is in contact with the ground and configured to detect whether the main body 210 is separated from the ground according to whether the switch is turned on or off.

In other words, the detection module 230 may include a switch that is turned on or off.

For example, the switch may be a push button switch.

Here, the support module 220 may be driven into the ground so that the detection module 230 is brought into contact with the ground.

The switch may generate the notification signal when switched from a state turned on by being brought into contact with the ground to a state turned off by being separated from the ground.

In other words, the detection module 230 may generate the notification signal when the support module 220 driven into the ground to be brought in contact with the ground is separated from the ground by an external physical force.

The detection module 230 may also include a sensor that senses a distance to the ground to detect whether the main body 210 is separated from the ground according to a sensing result of the sensor.

In other words, the detection module 230 may be a sensor that detects whether there is a subject within a detectable range.

For example, the sensor may be an infrared sensor.

Here, the support module 220 may be driven into the ground to an extent that a separation distance between the detection module 230 and the ground is within the detectable range of the detection module 230.

The sensor may generate the notification signal when the distance to the ground is changed from a state being within a predetermined distance to a state exceeding the predetermined distance.

In other words, the detection module 230 may generate the notification signal when a state in which the support module 220 driven into the ground senses the ground is changed to a state in which the support module 220 is separated from the ground by an external physical force by a distance exceeding the predetermined distance.

As described above, the detection module 230 may generate the notification signal by detecting separation from the ground in the detection mode state, and then transmit the notification signal to the communication module 240.

The communication module 240 may be operated by receiving power from the battery built in the main body 210.

The communication module 240 may be included inside the main body 210, and may be connected to an antenna provided on the top surface of the main body 210 to communicate with the communication target by transmitting the signal via the antenna.

Here, the communication target includes the robot 100, and may further include at least one of a terminal adjacent to the transmitter 200 and the terminal 300.

When receiving the signal transmitted from the detection module 230 in a state in which the detection mode is set, the communication module 240 may transmit the notification signal to the communication target.

The communication module 240 may also receive the signal transmitted from an adjacent transmitter 200.

When receiving the notification signal from the detection module 230, the communication module 240 may transmit the notification signal to at least one of the robot 100 and an adjacent transmitter 200 so that the notification signal is transmitted to the robot 100.

Here, the communication module 240 may transmit the notification signal to a target closest to the transmitter 200 among the communication target.

When transmitting the notification signal, the adjacent transmitter 200 may transmit the notification signal to at least one of the robot 100 and another adjacent transmitter 200.

When the communication module 240 receives the notification signal from an adjacent transmitter 200, the communication module 240 may transmit the notification signal to at least one of the robot 100 and another adjacent transmitter 200.

In other words, the notification signal may be transmitted so that the notification signal reaches the robot 100.

For example, when removal of a second transmitter 200 #2 is detected in a state in which the robot 100, a first transmitter 200 #1, and the second transmitter 200 #2 are sequentially arranged, the second transmitter 200 #2 generates a notification signal to transmit the notification signal to the first transmitter 200 #1, and the first transmitter 200 #1 receives the notification signal to transmit the notification signal to the robot 100.

As such, the transmitter 200 configured to generate the notification signal by detecting removal from the ground may further include an output module (not illustrated) configured to output a notification sound in response to the notification signal.

In other words, when the detection module 230 detects removal from the ground to generate the notification signal, the transmitter 200 further including the output module may externally output the notification sound for the removal.

When the robot 100 receives the notification signal from the transmitter 200, the robot 100 may perform an operation in response to the notification signal.

Upon receiving the notification signal, the robot 100 may externally output a voice notification for the removal of the transmitter 200.

In other words, when receiving the notification signal from the transmitter 200, the robot 100 may externally output a voice notification for the removal notifying that the transmitter 200 is removed from the ground.

In addition, when receiving the notification signal, the robot 100 may transmit information regarding the notification for the removal of the transmitter 200 to the terminal 300 communicating with the robot 100.

Here, the terminal 300 may display a screen for the notification for the removal of the transmitter 200 or may output a voice notification.

The system 1 that detects removal of the transmitter 200 from the ground such as theft in such a manner may include, as illustrated in FIG. 5, a plurality of transmitters 200 #1 to 200 #8 installed in the boundary area 1200 to transmit signals, and the robot 100 configured to determine a position based on a reception result of the transmitted signals to travel the travel area 1000. Wherein, each of the plurality of transmitters 200 #1 to 200 #8 may include, as illustrated in FIG. 6, the support module 220 provided on the bottom surface B of the main body 210 and driven into the ground to support the main body 210, the detection module 230 provided on the bottom surface B of the main body 210 and configured to detect whether the main body 210 is separated from the ground, and the communication module 240 to communicate with at least one of the robot 100 and an adjacent transmitter 200. When a result of a detection corresponds to a predetermined reference condition, the detection module 230 generates a notification signal for removal from the ground to transmit the notification signal to at least one of the robot 100 and an adjacent transmitter 200 to thereby detect whether the plurality of transmitters 200 #1 to 200 #8 is removed.

Here, the system 1 may further include the terminal 300 configured to communicate with the robot 100 to remotely control the robot 100.

In the system 1, each of the plurality of transmitters 200 #1 to 200 #8 may detect whether the main body 210 is removed from the ground in a state in which the detection mode for detecting whether the plurality of transmitters 200 #1 to 200 #8 is separated from the ground is set in the robot 100.

When the notification signal is received from the adjacent transmitter, each of the plurality of transmitters 200 #1 to 200 #8 may also transmit the notification signal to at least one of the robot 100 and another adjacent transmitter.

Figure 8:
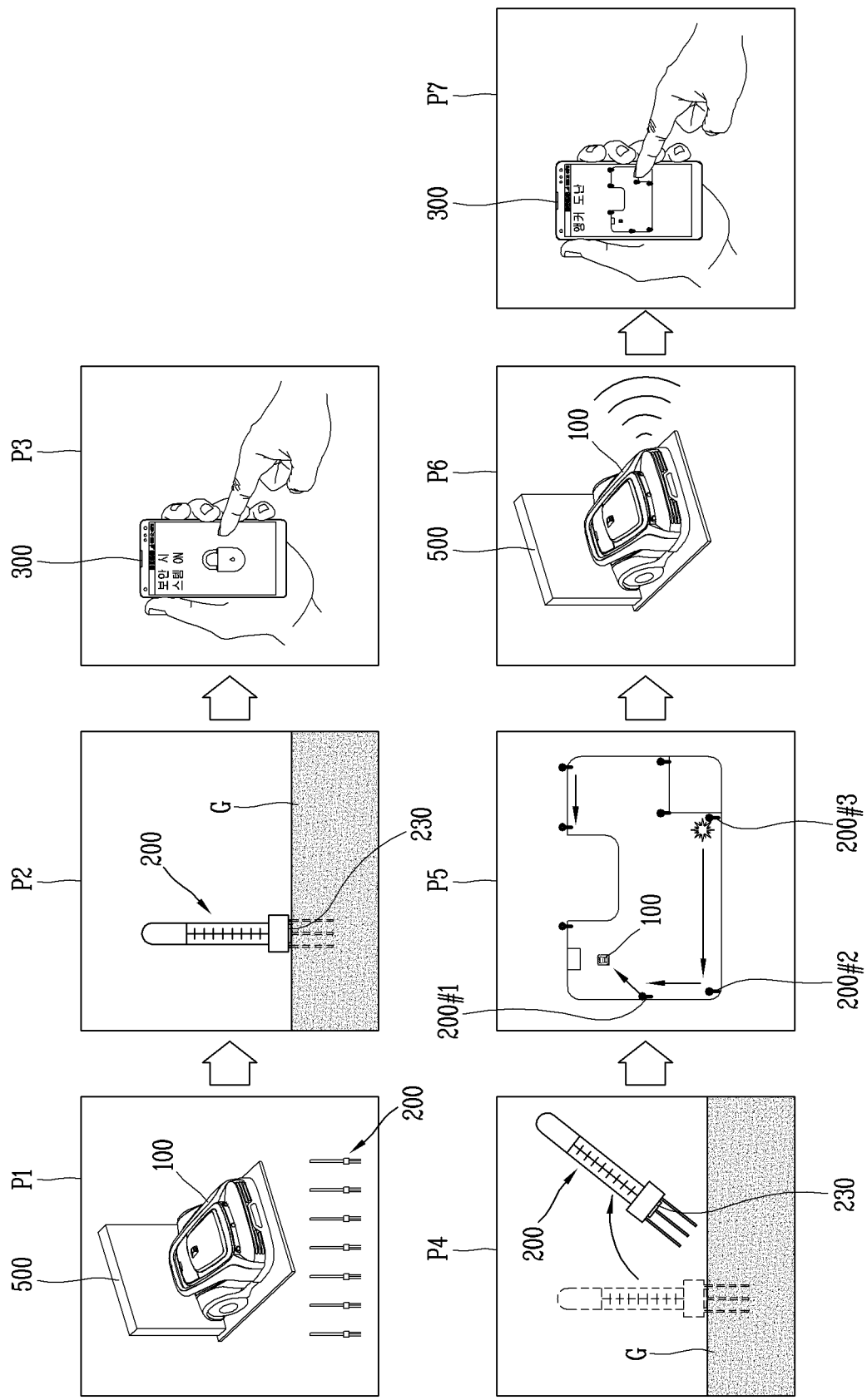
FIG. 8 is a conceptual view illustrating a process of detecting removal of a transmitter of a moving robot system according to an embodiment from its installation position.

A detailed detection process of the system 1 may be as illustrated in FIG. 8.

First, the robot 100 and the plurality of transmitters 200 #1 to 200 #8 are paired before the plurality of transmitters 200 #1 to 200 #8 is installed in the boundary area 1200 [P1].

After the robot 100 and the plurality of transmitters 200 #1 to 200 #8 are paired [P1], the plurality of transmitters 200 #1 to 200 #8 is installed in the boundary area 1200 in a distributed manner [P2]. Here, each of the plurality of transmitters 200 #1 to 200 #8 may be installed such that the support module 220 is driven into the ground to an extent that a distance between the detection module 230 and the ground is within a predetermined distance.

After the plurality of transmitters 200 #1 to 200 #8 is installed in the boundary area 1200, each of the plurality of transmitters 200 #1 to 200 #8 transmits a signal to the robot 100. Then, the robot 100 determines positions of each of the plurality of transmitters 200 #1 to 200 #8 based on the transmitted signals to transmit position information to the terminal 300. In the terminal 300, the detection mode is set in response to user's manipulation, and a signal for the setting of the detection mode is transmitted to the robot 100 and each of the plurality of transmitters 200 #1 to 200 #8 to thereby allow the robot 100 and each of the plurality of transmitters 200 #1 to 200 #8 to perform an operation according to the detection mode [P3].

Thereafter, when at least one of the plurality of transmitters 200 #1 to 200 #8 is removed from the ground due to theft or the like, a detection module 230 of a corresponding transmitter detects the removal to generate the notification signal [P4].

Thereafter, a communication module 240 of the corresponding transmitter transmits the notification signal to at least one of the robot 100 and an adjacent transmitter, and the adjacent transmitter receives the notification signal from the corresponding transmitter to transmit the notification signal to at least one of the robot 100 and another adjacent transmitter. Here, for example, when a third transmitter 200 #3 is the corresponding transmitter, the third transmitter 200 #3 transmits the notification signal to a second transmitter 200 #2 adjacent to the third transmitter 200 #3, and the second transmitter 200 #2 transmits the notification signal to a first transmitter 200 #1 adjacent to the second transmitter 200 #2, and the first transmitter 200 #1 transmits the notification signal to the robot 100 adjacent to the first transmitter 200 #1 [P5].

When the robot 100 receives the notification signal, the robot 100 may externally output a voice notification for the removal notifying that the transmitter 200 is removed from the ground [P6].

The robot 100 also transmits information regarding the notification for the removal of the transmitter 200 to the terminal 300, so that the removal of the transmitter 200 from the ground is displayed on the screen or outputted as a voice via the terminal 300 [P7].

Figure 9:
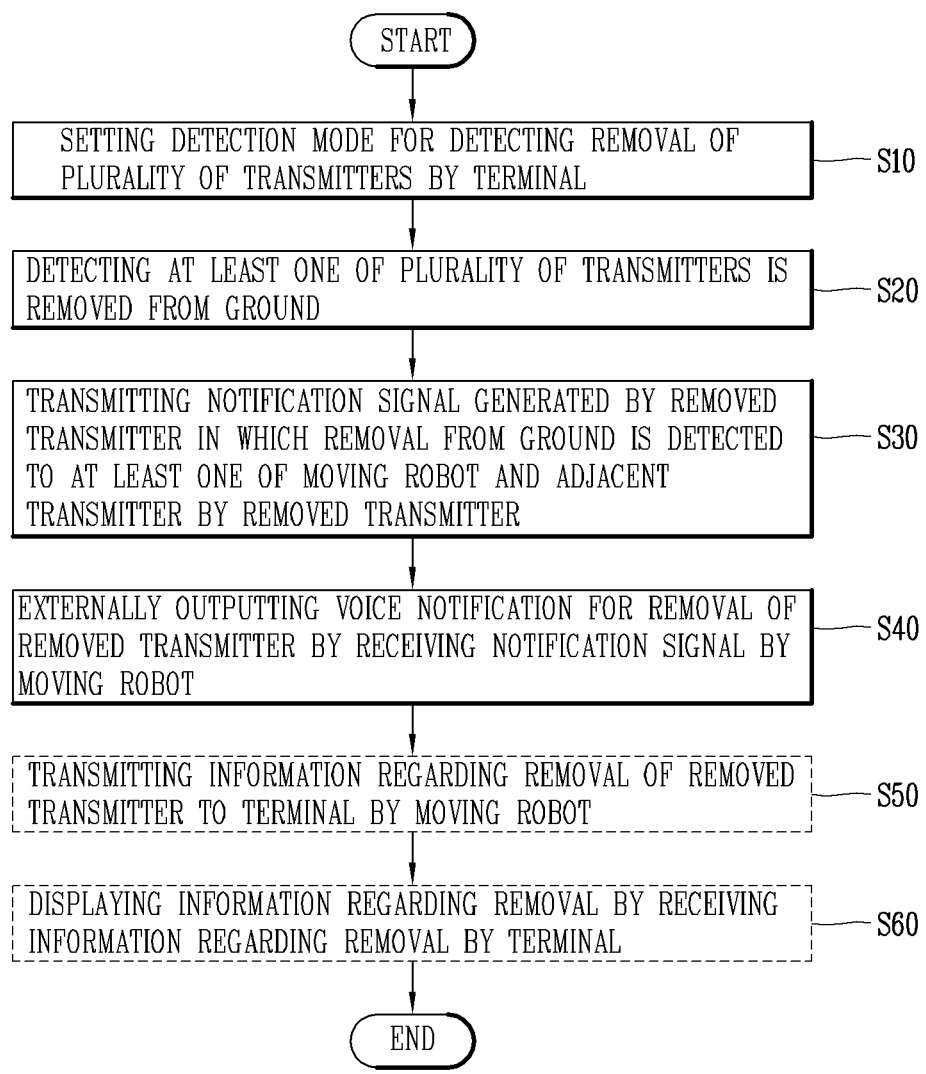
FIG. 9 is a flowchart showing a sequence of a method for detecting removal of a transmitter of a moving robot system according to an embodiment from its installation position.

Meanwhile, a method for detecting removal of the transmitter of the system 1 including the plurality of transmitters 200 #1 to 200 #8, the robot 100, and the terminal 300 (hereinafter referred to as a detection method) may be as shown in FIG. 9.

The detection method is a method for detecting removal of the plurality of transmitters 200 #1 to 200 #8 in the system 1 including the plurality of transmitters 200 #1 to 200 #8, the robot 100, and the terminal 300. The method includes, as shown in FIG. 9, setting a detection mode for detecting removal of the plurality of transmitters 200 #1 to 200 #8 by the terminal 300 [S10], detecting at least one of the plurality of transmitters 200 #1 to 200 #8 is removed from the ground [S20], transmitting a notification signal generated by a removed transmitter in which the removal from the ground is detected to at least one of the robot 100 and an adjacent transmitter by the removed transmitter [S30], and externally outputting a voice notification for the removal of the removed transmitter by receiving the notification signal by the robot 100 [S40].

The setting the detection mode for detecting removal of the plurality of transmitters 200 #1 to 200 #8 by the terminal 300 [S10] may be a step of setting the detection mode in the robot 100 and the plurality of transmitters 200 #1 to 200 #8.

Accordingly, the robot 100 and the plurality of transmitters 200 #1 to 200 #8 may operate according to the detection mode.

The setting the detection mode for detecting removal of the plurality of transmitters 200 #1 to 200 #8 by the terminal 300 [S10] may include, as shown in FIG. 10, connecting communication between the plurality of transmitters 200 #1 to 200 #8 and the robot 100 [S11], installing each of the plurality of transmitters 200 #1 to 200 #8 in the boundary area 1200 [S12], determining installation positions of the plurality of transmitters 200 #1 to 200 #8 by receiving signals transmitted from each of the plurality of transmitters 200 #1 to 200 #8 by the robot 100 [S13], transmitting position information regarding the installation positions of the plurality of transmitters 200 #1 to 200 #8 to the terminal 300 by the robot 100 [S14], and setting the detection mode according to the position information by receiving the position information by the terminal 300 [S15].

The connecting communication between the plurality of transmitters 200 #1 to 200 #8 and the robot 100 [S11] may be a step of registering a list of the plurality of transmitters 200 #1 to 200 #8 in the robot 100 after the plurality of transmitters 200 #1 to 200 #8 and the robot 100 are paired.

Accordingly, the robot 100 may recognize each of the plurality of transmitters 200 #1 to 200 #8.

The installing each of the plurality of transmitters 200 #1 to 200 #8 in the boundary area 1200 [S12] may be a step of installing each of the plurality of transmitters 200 #1 to 200 #8 paired with the robot 100 in the boundary area 1200 in a distributed manner.

The determining installation positions of the plurality of transmitters 200 #1 to 200 #8 by receiving the signals transmitted from each of the plurality of transmitters 200 #1 to 200 #8 by the robot 100 [S13] may be a step of determining installation positions of each of the plurality of transmitters 200 #1 to 200 #8 by the robot 100 by receiving the signals transmitted from each of the plurality of transmitters 200 #1 to 200 #8 installed in the boundary area 1200 in a distributed manner.

The transmitting position information regarding the installation positions of the plurality of transmitters 200 #1 to 200 #8 to the terminal 300 by the robot 100 [S14] may be a step of transmitting a result of determination on installation positions of each of the plurality of transmitters 200 #1 to 200 #8 to the terminal 300 by the robot 100.

The setting the detection mode according to the position information by receiving the position information by the terminal 300 [S15] may be a step of generating or updating map information regarding the travel area 1000 according to the installation positions of each of the plurality of transmitters 200 #1 to 200 #8 received from the robot 100 to set the detection mode in the robot 100 and the plurality of transmitters 200 #1 to 200 #8 according to the map information by the terminal 300.

Accordingly, removal of the plurality of transmitters 200 #1 to 200 #8 from positions where the plurality of transmitters 200 #1 to 200 #8 is installed may be detected.

Thereafter, upon detecting at least one of the plurality of transmitters 200 #1 to 200 #8 is removed from the ground [S20], a removed transmitter in which removal from the ground is detected may generate a notification signal to transmit the notification signal to at least one of the robot 100 and an adjacent transmitter [S30], and the robot 100 may receive the notification signal to externally output a voice notification for the removal of the removed transmitter [S40].

In addition, the detection method may further include transmitting information regarding the removal of the removed transmitter to the terminal 300 by the robot 100 [S50], and displaying the information regarding the removal by receiving the information regarding the removal by the terminal 300 [S60].

The detection method including the setting the detection mode for detecting removal of the plurality of transmitters 200 #1 to 200 #8 by the terminal 300 [S10], detecting at least one of the plurality of transmitters 200 #1 to 200 #8 is removed from the ground [S20], transmitting a notification signal generated by a removed transmitter in which the removal from the ground is detected to at least one of the robot 100 and an adjacent transmitter by the removed transmitter [S30], and externally outputting a voice notification for the removal of the removed transmitter by receiving the notification signal by the robot 100 [S40] can be implemented as computer-readable codes on a program-recorded medium. The computer-readable media may include all types of recording devices each storing data readable by a computer system. Examples of such computer-readable medium may include hard disk drive (HDD), solid state disk (SSD), silicon disk drive (SDD), ROM, RAM, CD-ROM, magnetic tape, floppy disk, optical data storage element and the like. Also, the computer-readable media may also be implemented as a format of carrier wave (e.g., transmission via an Internet).

While the present disclosure has been particularly shown and described with reference to embodiments thereof, it will be understood that various changes in form and details may be made therein without departing from the spirit and scope of the present disclosure as defined by the following claims. Therefore, the scope of the present disclosure should not be limited to the described embodiments, but should be determined by the scope of the appended claims and equivalents thereof.

While the present disclosure has been particularly shown and described with reference to exemplary embodiments, described herein, and drawings, it may be understood by one of ordinary skill in the art that various changes and modifications thereof may be made. Therefore, the scope of the present disclosure should be defined by the following claims, and various changes equal or equivalent to, the claims pertain to the category of the concept of the present disclosure.

What is claimed is:

1. A transmitter of a moving robot system installed in a travel area of a moving robot, the transmitter comprising:
a main body;
a support module provided on a bottom surface of the main body and configured to be driven into a ground surface to support the main body;
a detection module provided on the bottom surface of the main body and configured to detect whether the main body is separated from the ground surface; and
a communication module in wireless communication with a communication target of the transmitter, wherein the moving robot is configured to activate and deactivate a detection mode that is set in the moving robot for detecting whether the transmitter is removed, wherein the detection module is configured to detect whether the main body is separated from the ground surface when the detection mode is activated, wherein the detection module is configured to not detect whether the main body is separated from the ground surface when the detection mode is deactivated, wherein when the detection module detects that the main body is separated from the ground surface, the detection module generates a notification signal indicating removal of the transmitter, and wherein the communication module transmits the notification signal to the communication target.

2. The transmitter of claim 1, wherein the support module comprises a plurality of pins configured to be vertically driven into the ground.

3. The transmitter of claim 2, wherein the plurality of pins is configured to be driven into the ground such that a distance between the bottom surface of the main body and the ground surface is within a predetermined distance.

4. The transmitter of claim 1, wherein the detection module comprises a switch that is turned on or off according to whether the main body is in contact with the ground surface or is separated from the ground surface.

5. The transmitter of claim 4, wherein the detection module generates the notification signal when the switch transitions from an on state to an off state, the on state correlating to the main body being in contact with the ground surface and the off state correlating to the main body being separated from the ground surface.

6. The transmitter of claim 1, wherein the detection module is provided with a sensor configured to sense a distance to the ground surface to detect whether the main body is separated from the ground.

7. The transmitter of claim 6, wherein the detection module generates the notification signal when the sensor senses that the distance to the ground surface is equal to or exceeds a predetermined distance.

8. The transmitter of claim 1, wherein the communication module is configured to transmit the notification signal to at least one of the moving robot and an adjacent transmitter.

9. The transmitter of claim 8, wherein the adjacent transmitter is configured to transmit the notification signal to at least one of the moving robot and another adjacent transmitter.

10. The transmitter of claim 1, wherein the communication module is configured to transmit the notification signal to at least one of the moving robot and another adjacent transmitter.

11. The transmitter of claim 1, further comprising:
an output module configured to emit a notification sound in response to the notification signal.

12. The transmitter of claim 1, wherein the moving robot is configured to emit a voice notification indicating removal of the transmitter, upon receiving the notification signal.

13. The transmitter of claim 1, wherein the moving robot is configured to transmit information regarding removal of the transmitter to a terminal communicating with the moving robot, upon receiving the notification signal.

14. A moving robot system, comprising:
a plurality of transmitters installed in a boundary area of a travel area and configured to transmit one or more signals; and
a moving robot that determines a position based on a reception result of the transmitted signals,
wherein each of the plurality of transmitters comprises:
a support module provided on a bottom surface of a main body and configured to be driven into a ground surface to support the main body;
a detection module provided on the bottom surface of the main body and configured to detect whether the main body is separated from the ground surface; and
a communication module in wireless communication with a communication target of the transmitter,
wherein the moving robot is configured to activate and deactivate a detection mode that is set in the moving robot for detecting whether at least one of the plurality of transmitters is removed,
wherein each of the plurality of transmitters is configured to detect whether the main body is separated from the ground surface when the detection mode is activated,
wherein each of the plurality of transmitters is configured to not detect whether the main body is separated from the ground surface when the detection mode is deactivated, and
wherein each of the plurality of transmitters generates a notification signal and transmits the notification signal to at least one of the moving robot and an adjacent transmitter when a corresponding detection module detects that the main body is separated from the ground surface.

15. The moving robot system of claim 14, wherein each of the plurality of transmitters is configured to transmit the notification signal to at least one of the moving robot and another adjacent transmitter, upon receiving the notification signal from the adjacent transmitter.

16. A method for detecting removal of a transmitter of a moving robot system comprising a plurality of transmitters installed in a boundary area of a travel area of a moving robot, the method comprising:
providing a terminal configured to remotely control the moving robot by wireless communication with the moving robot;
setting a detection mode via the terminal for detecting removal of the plurality of transmitters;
detecting at least one of the plurality of transmitters is removed from a ground surface;
transmitting a notification signal generated by a removed transmitter to at least one of the moving robot and a transmitter adjacent to the removed transmitter; and
emitting a voice notification indicating removal of the removed transmitter.

17. The method of claim 16, wherein setting the detection mode comprises:
establishing communication between the plurality of transmitters and the moving robot;
installing each of the plurality of transmitters in the boundary area;
determining installation positions of the plurality of transmitters by receiving the signals transmitted from each of the plurality of transmitters to the moving robot;
transmitting position information regarding the installation positions of the plurality of transmitters to the terminal via the moving robot; and
setting the detection mode according to the position information received by the terminal.

18. The method of claim 16, further comprising:
transmitting information regarding the removal of one or more transmitters to the terminal via the moving robot; and displaying the information regarding the removal via a display of the terminal.

\* \* \* \* \*